(No Model.) 2 Sheets—Sheet 1.
E. S. BROWN.
TENSION AND TAKE UP DEVICE FOR HARVESTERS.
No. 496,680. Patented May 2, 1893.
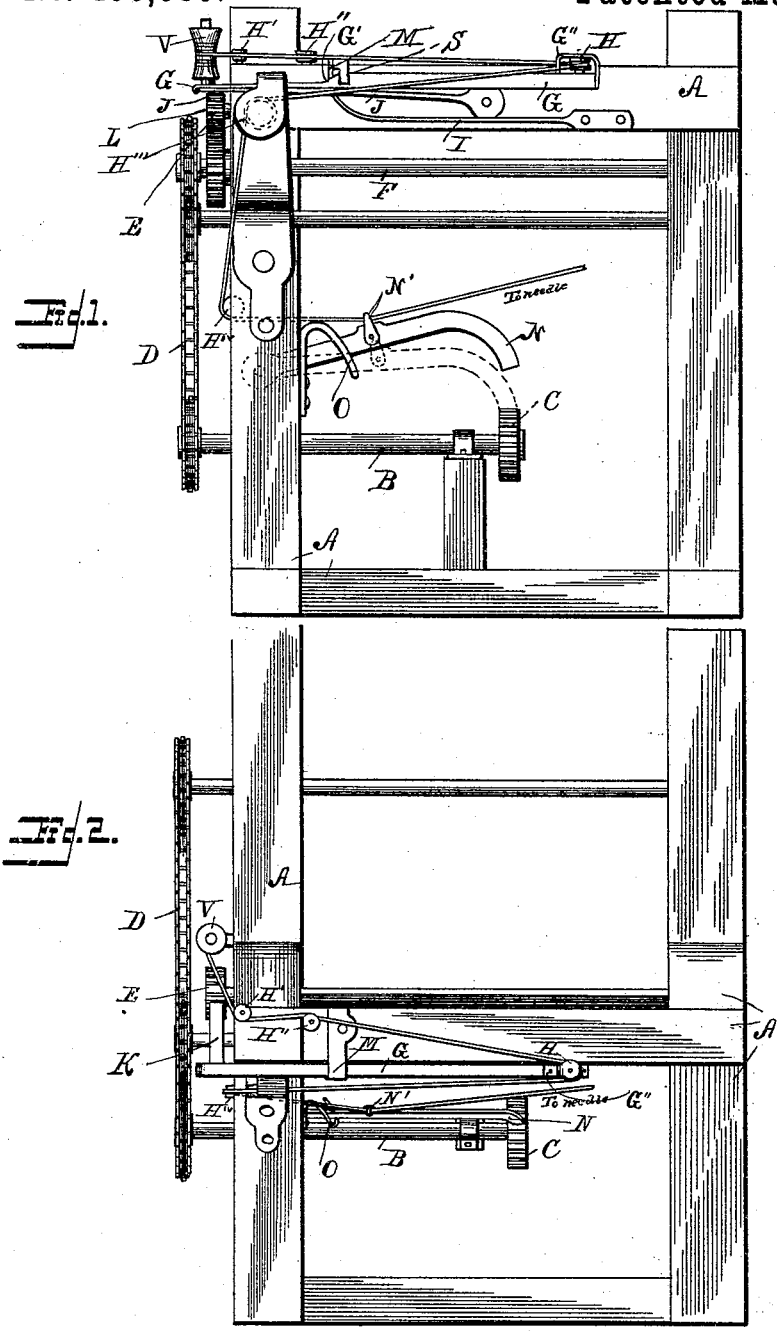

(No Model.) 2 Sheets—Sheet 2.
E. S. BROWN.
TENSION AND TAKE UP DEVICE FOR HARVESTERS.
No. 496,680. Patented May 2, 1893.
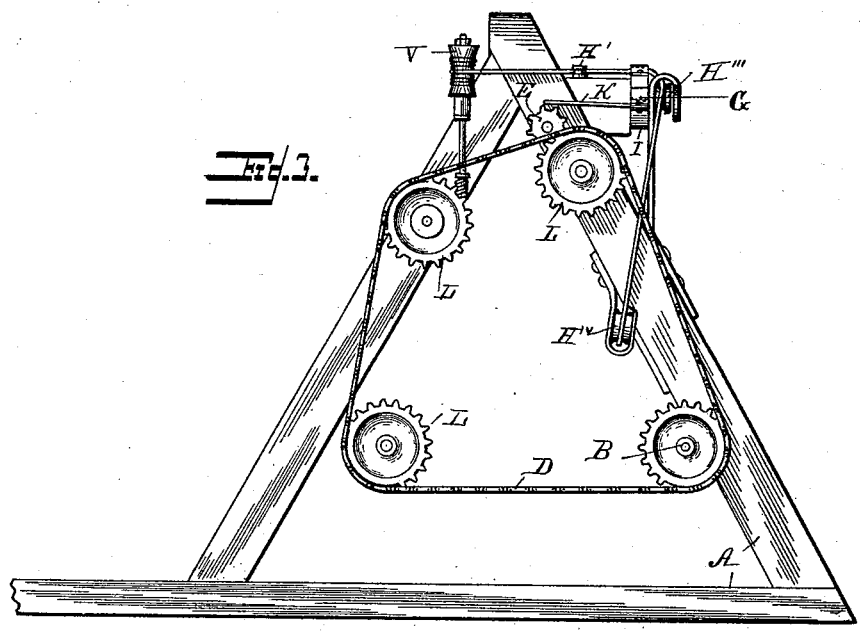
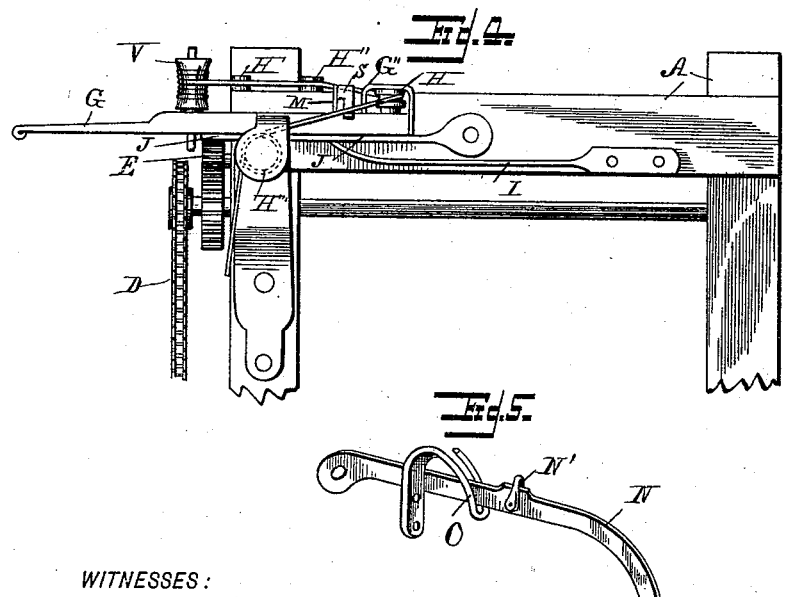
WITNESSES:
INVENTOR
E. S. Brown
BY
ATTORNEYS.

UNITED STATES PATENT OFFICE.

EDWARD S. BROWN, OF SIOUX CITY, IOWA.

TENSION AND TAKE-UP DEVICE FOR HARVESTERS.

SPECIFICATION forming part of Letters Patent No. 496,680, dated May 2, 1893.

Application filed March 19, 1892. Serial No. 425,532. (No model.)

*To all whom it may concern:*

Be it known that I, EDWARD S. BROWN, a citizen of the United States, residing at Sioux City, in the county of Woodbury and State of Iowa, have invented certain new and useful Improvements in Harvester Attachments; and I do hereby declare the following to be a full, clear, and exact description of the invention, such as will enable others skilled in the art to which it appertains to make and use the same.

The object of this invention is to provide means whereby an alarm may be given whenever the twine used by a self-binder is exhausted or broken or caught, or for any reason is not paid out freely. Without extraordinary care, or the employment of some device having these objects, it will often happen that a bundle is thrown out unbound because the supply of twine is exhausted. Again a knot or "snarl" in the twine causes it to break, and the attendant is first aware of the fact when unbound grain is discharged; and if the twine break whatever the cause, the machine must be stopped and again threaded up.

In the drawings:—Figure 1 is a rear view of a portion of the harvester frame with my devices in place,—only such parts of the machine being shown as are necessary to make clear the operation of my devices. Fig. 2 is a top or plan view of the same parts. Fig. 3 is a view looking to the right in Fig. 1. Fig. 4 is a view in the same direction as in Fig. 1 showing a different position of certain parts. Fig. 5 is a detail view hereinafter explained.

In the figures A is the upper part of an ordinary harvester frame, or that part below and within which the main supporting and driving wheel (not shown) lies, and B is a short shaft having at its inner end a pinion C, driven through suitable connections from the supporting wheel, and at its outer end a sprocket wheel. This latter by means of a sprocket chain D and sprocket wheels L drives the elevator rollers F at the top of the machine. A twine spool V (which may be a box containing a twine ball) is fixed to the frame in any convenient position. Upon the rear of the upper member of the frame A is mounted a horizontally sliding bar G having a rounded offset or an incline G' in its upper side and in its end an anti-friction wheel or pulley H.

The bar is depressible in its bearings S, but is held at its upper limit by a suitable spring I which offers only a slight frictional resistance to the sliding of the bar. Beneath the outer portion of the bar is a second spring J which has rigidly attached to its outer end a transverse spring plate K above and in the plane of the pinion E upon one of the elevator roller shafts. The twine is carried from the spool or box around fixed pulleys H' H", thence around the pulley H and back nearly parallel to the bar G over a pulley H''' and thence around a pulley H$^{iv}$ and so on through other suitable guides to the needle. Now if the twine for any reason be not delivered from the spool or box the tension produced suffices to slide the bar G outward forcing the rounded shoulder G' beneath a fixed stop M and thus depressing it, the spring I yielding to permit the depression. This depression forces down the spring J and presses the spring plate K upon the teeth of the pinion beneath it where it is held while the bar G moves outward until a stop G" thereon strikes the stop M, or in other words until the machine has used twine equal in length to twice the distance through which the bar has moved. Meantime the spring plate K gives a sharp click as each gear tooth slips from beneath it, and allows it to fall upon the next, and if the length of the bar be sufficient, or about such as shown, this time is amply sufficient to allow the driver, who has been warned by the alarm, to stop the machine. The machine being thus stopped before the slack caused by the sliding of the bar, has been taken up, the obstruction to the feeding of the twine is removed, the bar is replaced in its normal position by the attendant, and the machine without a break having occurred, is ready for further advance. This alarm evidently gives no notice of exhaustion of the spool or ball of twine. For this purpose other devices are employed. Above the pinion C is a thin spring latch N pivoted to the frame A and provided with an eye N', at some distance from the pivot for the passage of the twine, whose normal course is directly over the eye in a straight line from the pulley H$^{iv}$. The latch is held in a rigid slotted guide, O, which allows vertical movement only. Now the twine passing from the pulley H$^{iv}$ is passed through this eye, and as long as the normal tension is maintained the latch is held up away from the pinion C. But if the tension cease by reason of the exhaustion of the supply or for other reason, the twine sags, and the latch falls, its flat end passing between the cogs. The motion of these latter springs the latch to one side, the body being held by the guide, and as each passes from beneath it, the same sharp click as before is the result. This occurs while several feet of twine are yet unused, and hence, as before, the machine can be stopped before any trouble results from the lack of twine.

What I claim is—

1. In devices of the class described, the combination with a bar sliding transversely to the normal path of the binding twine, of a twine guide upon said bar at one side of said path, a spring resisting the sliding of the bar, and an alarm in the path of said bar; whereby when the twine's tension overcomes the resistance of the spring and slides the bar, the attention of the operator is attracted.

2. The combination with the frame, a gear rotating whenever the machine is in operation, and the twine spool or box, of the spring pressed sliding bar bearing the twine guide and having the rounded or inclined shoulder, the spring plate arranged to be pressed upon said gear by the sliding of the bar, and suitable twine guides upon opposite sides of the bar, substantially as and for the purpose set forth.

3. The combination with the frame and the gear moving whenever the machine is in operation, of the pivoted spring latch arranged to drop into the teeth of said gear and provided with an eye for the twine, and twine guides adapted to carry the twine above said latch and substantially in its plane; whereby when the twine is passed through said eye, the latch will be held out of the gear teeth only so long as tension upon the twine is maintained.

In testimony whereof I affix my signature in presence of two witnesses.

EDWARD S. BROWN.

Witnesses:
WM. H. WARNER,
AMOS NICHOLS.